(12) United States Patent
Smith et al.

(10) Patent No.: US 9,677,476 B2
(45) Date of Patent: Jun. 13, 2017

(54) MODEL-BASED FEED FORWARD APPROACH TO COORDINATED AIR-FUEL CONTROL ON A GAS TURBINE

(71) Applicant: General Electric Company, Schenectady, NY (US)

(72) Inventors: Jonathan York Smith, Greenville, SC (US); John Rogers Huey, Greenville, SC (US); Prabhanjana Kalya, Hyderabad (IN)

(73) Assignee: General Electric Company, Schenectady, NY (US)

( * ) Notice: Subject to any disclaimer, the term of this patent is extended or adjusted under 35 U.S.C. 154(b) by 551 days.

(21) Appl. No.: 14/190,181

(22) Filed: Feb. 26, 2014

(65) Prior Publication Data
US 2015/0240726 A1 Aug. 27, 2015

(51) Int. Cl.
*F02C 9/16* (2006.01)
*F02C 9/26* (2006.01)
(Continued)

(52) U.S. Cl.
CPC .............. *F02C 9/22* (2013.01); *F02C 9/00* (2013.01); *G05B 13/042* (2013.01);
(Continued)

(58) Field of Classification Search
CPC ...... F02C 9/00; F02C 9/16; F02C 9/26; F02C 9/28; F02C 99/44; F02C 9/20; F02C 9/48;
(Continued)

(56) References Cited

U.S. PATENT DOCUMENTS 4,341,071 A * 7/1982 Abo .................... F02C 9/28
60/39.281
6,634,165 B2 * 10/2003 Tomlinson ............... F01D 17/08
60/39.3
(Continued)

FOREIGN PATENT DOCUMENTS

EP 1420153 A2 5/2004
EP 2617967 A2 7/2013

OTHER PUBLICATIONS

European Search Report and Opinion issued in connection with corresponding EP Application No. 15155414.4 on Jul. 20, 2015.

*Primary Examiner* — Brian D Nash
(74) *Attorney, Agent, or Firm* — Cooper Legal Group LLC

(57) ABSTRACT

Presented herein are turbine machines, turbine control systems, methods, and computer-readable storage devices for controlling turbines including a compressor, a combustion system, and a turbine section comprising a turbine operating at an initial turbine output while using initial parameter values for the respective control parameters of the turbine. The techniques involve, for respective selected control parameters, selecting an adjustment of the initial parameter value of the selected control parameter, and predicting a predicted turbine output of the turbine operated using the adjustment of the selected control parameter and the initial parameter values for other control parameters; comparing the predicted turbine outputs for the adjustments of the respective control parameters to select, from the control parameters, a target control parameter having a target adjustment that results in the target turbine output; and operating the turbine with the target adjustment of the target control parameter.

16 Claims, 8 Drawing Sheets

(51) Int. Cl.
*F02C 9/28* (2006.01)
*G05B 15/00* (2006.01)
*F02C 9/22* (2006.01)
*F02C 9/00* (2006.01)
*G05B 13/04* (2006.01)

(52) U.S. Cl.
CPC .... *F05D 2260/821* (2013.01); *F05D 2270/05* (2013.01); *F05D 2270/71* (2013.01)

(58) Field of Classification Search
CPC ... F02C 9/50; F02C 9/54; G05B 17/00; G05B 15/00; F05B 2270/00–2270/337; F23N 2041/20
USPC .......................................................... 60/773
See application file for complete search history.

(56) References Cited

U.S. PATENT DOCUMENTS

| | | | | |
|---|---|---|---|---|
| 7,219,040 B2* | 5/2007 | Renou | ................ | F02C 9/28 |
| | | | | 700/177 |
| 7,234,305 B2* | 6/2007 | Nomura | ................ | F01D 17/162 |
| | | | | 60/773 |
| 7,822,512 B2* | 10/2010 | Thatcher | ................ | F02C 9/20 |
| | | | | 700/287 |
| 7,854,110 B2* | 12/2010 | LaGrow | ................ | F02C 3/22 |
| | | | | 60/39.281 |
| 7,877,979 B2* | 2/2011 | Osakabe | ................ | F01K 23/067 |
| | | | | 60/39.12 |
| 8,015,791 B2* | 9/2011 | Finkbeiner | ................ | F02C 7/22 |
| | | | | 60/39.281 |
| 8,171,717 B2 | 5/2012 | Mosley et al. | | |
| 8,215,095 B2 | 7/2012 | Mosley | | |
| 8,639,480 B2* | 1/2014 | Arnold | ................ | F02C 7/057 |
| | | | | 415/118 |
| 9,014,945 B2* | 4/2015 | Abrol | ................ | F02C 9/48 |
| | | | | 60/39.27 |
| 2004/0088060 A1 | 5/2004 | Renou et al. | | |
| 2008/0243352 A1 | 10/2008 | Healy | | |
| 2014/0123624 A1* | 5/2014 | Minto | ................ | F23N 5/18 |
| | | | | 60/39.281 |
| 2015/0185716 A1* | 7/2015 | Wichmann | ................ | F01K 23/101 |
| | | | | 700/287 |
| 2015/0204239 A1* | 7/2015 | Minto | ................ | F02C 3/34 |
| | | | | 60/772 |
| 2016/0010493 A1* | 1/2016 | O'Dea | ................ | F23N 5/18 |
| | | | | 60/776 |

* cited by examiner

MODEL-BASED FEED FORWARD APPROACH TO COORDINATED AIR-FUEL CONTROL ON A GAS TURBINE

BACKGROUND OF THE INVENTION

Field of the Invention

The present disclosure is related to the control of a turbine to achieve a target turbine output.

Discussion of the Prior Art

The operation of a turbine is typically controlled by adjusting various control parameters of the turbine, such as an air flow rate that is adjustable via an angle adjustment of the vanes of an inlet guide vane (IGV) in order to alter the volume and rate of air directed at the turbine. Such adjustments of the control parameters of the turbine may be selected to adjust a current turbine output (e.g., the temperature of the turbine) toward a target turbine output. For example, upon receiving a target turbine output that is higher than an initial turbine output achieved while operating at a set of initial parameter values, a controller may steadily adjust the respective control parameters of the turbine toward target control parameters, in order to raise the turbine output of the turbine. A feedback-based turbine control system may monitor the effects of such adjustments of the control parameters on the turbine output, and may iteratively and incrementally adjust the parameter values of the control parameters in a manner that migrates the current turbine output toward the target turbine output.

BRIEF DESCRIPTION OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, the present invention provides a turbine machine operating at an initial turbine output. In one such embodiment, the turbine machine includes a compressor; a combustion system; a turbine section including a turbine operated while using, for respective control parameters of the turbine machine, an initial parameter value of the control parameter; and a turbine control system. The turbine control system more particularly includes a modeler that predicts a predicted turbine output when the turbine is operated at, for respective control parameters, a parameter value; and a controller that, for respective selected control parameters, selects an adjustment of the initial parameter value of the selected control parameter, and invokes the modeler with the adjustment of the selected control parameter and the initial parameter values for other control parameters to predict a predicted turbine output for the selected control parameter; compares the predicted turbine outputs for the adjustments of the respective control parameters to select, from the control parameters, a target control parameter having a target adjustment that results in the target turbine output; and operates the turbine with the target adjustment of the target control parameter.

In accordance with another aspect, the present invention provides a method for achieving a target turbine output of a turbine operating at an initial turbine output while using, for respective control parameters of the turbine machine, an initial parameter value for the control parameter. In one such embodiment, the method includes, for respective selected control parameters: selecting an adjustment of the initial parameter value of the selected control parameter, and predicting a predicted turbine output of the turbine operated using the adjustment of the selected control parameter and the initial parameter values for other control parameters. The method also includes comparing the predicted turbine outputs for the adjustments of the respective control parameters to select, from the control parameters, a target control parameter having a target adjustment that results in the target turbine output. The method also includes operating the turbine with the target adjustment of the target control parameter.

In accordance with another aspect, the present invention provides a computer-readable storage device storing instructions, when executed on a processor of a device, cause the device to achieve a target turbine output of a turbine operating at an initial turbine output while using, for respective control parameters of the turbine machine, an initial parameter value for the control parameter. The instructions achieve this result by causing the device to, for respective selected control parameters, select an adjustment of the initial parameter value of the selected control parameter, and predict a predicted turbine output of the turbine operated using the adjustment of the selected control parameter and the initial parameter values for other control parameters; to compare the predicted turbine outputs for the adjustments of the respective control parameters to select, from the control parameters, a target control parameter having a target adjustment that results in the target turbine output; and to operate the turbine with the target adjustment of the target control parameter.

To the accomplishment of the foregoing and related ends, the following description and annexed drawings set forth certain illustrative aspects and implementations. These are indicative of but a few of the various ways of embodying one or more aspects of the presented techniques. Other aspects, advantages, and novel features of the disclosure will become apparent from the following detailed description when considered in conjunction with the annexed drawings.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

A. Introduction

Within the field of turbines, many types of control techniques are usable to adjust an initial turbine output of a turbine (e.g., the power output and/or operating temperature of the turbine) toward a target turbine output. Such adjustment may be achieved by altering various control parameters affecting the operation and output of the turbine, such as the angle of the blades of an inlet guide vane, which is adjustable to alter the rate or volume of air directed into the compressor. As a first such example, a demand for an increase from a current power output from the turbine to a desired, higher power output may be achieved by increasing the rate of fuel flow into the combustion system. The increased rate of fuel flow also tends to increase the exhaust temperature output from the turbine. Increasing the inlet guide vane from an initial angle to a target angle that directs a greater volume of air into the compressor, may achieve a target exhaust temperature while the turbine power output is increased. As a second example, reduced load may call for a reduction from the current power output to a desired, lower power output by adjusting one or more control parameters in the reverse direction. As a third example, various control parameters of the turbine may fluctuate (such as the compressor bleed flows) that may alter the power output of the turbine operated using a set of initial parameter values of the respective control parameters, and maintaining the desired power output may involve adjusting the parameter values of the respective control parameters to maintain the desired power output. Such fluctuations may also include fluctuations in operating conditions of the turbine that are not among the control parameters of the turbine, such as weather conditions of the local region of the turbine.

In these and other scenarios, various techniques may be used to control the control parameters of the respective controllable components of the turbine affecting the turbine output. Different techniques may result in differences in the control of the turbine output, such as the responsiveness to differences between the initial turbine output and the target turbine output (e.g., how rapidly the turbine output migrates toward a different target turbine output, or responds to fluctuations in the initial turbine output to return to the target turbine output); the rate with which the power output may be increased or decreased between an initial turbine output and a target turbine output; the magnitude with which adjustment may overshoot a target turbine output; and the achievable precision of maintaining the target turbine output. For these and other reasons, the choice of turbine control systems may significantly affect the proficiency of turbine control.

Figure 1A:
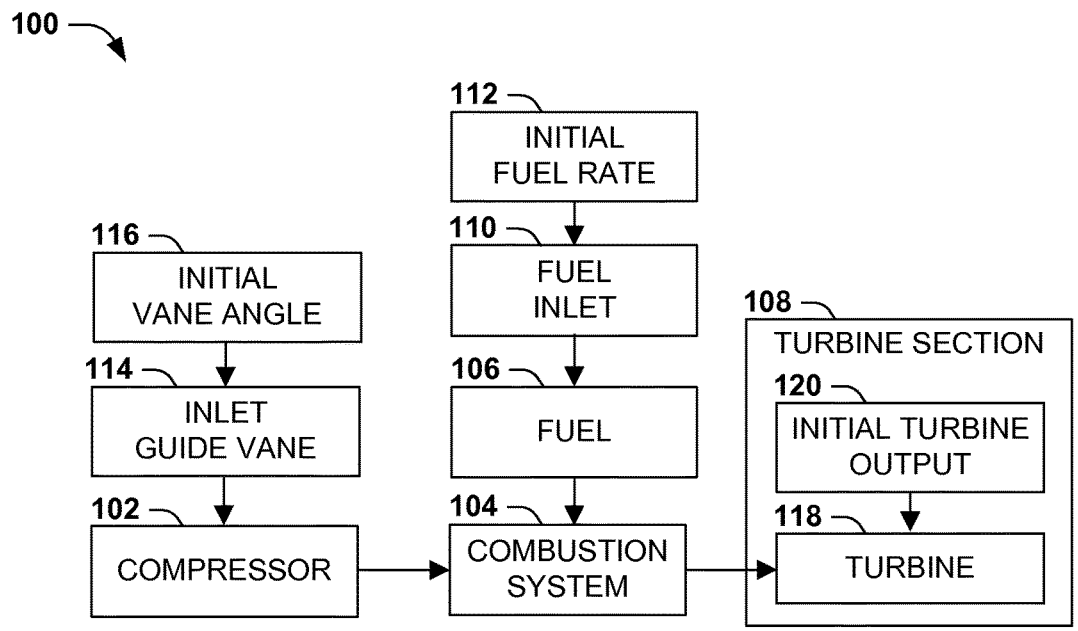
FIGS. 1A-1B are schematic illustrations of an example turbine machine with feedback-based turbine control.

In an example turbine machine 100 of FIG. 1A, an inlet guide vane 114 operating at an initial vane angle 116 directs air into a compressor 102, which directs compressed air into a combustion system 104. A fuel inlet 110 injects fuel 106 at an initial fuel rate 112 into the combustion system 104, and the pressurized air/fuel combination is ignited. The resulting energy drives a turbine 118 in a turbine section 108 at an initial turbine output 120, and the spent air/fuel combination is emitted as exhaust from the turbine 118.

Figure 1B:
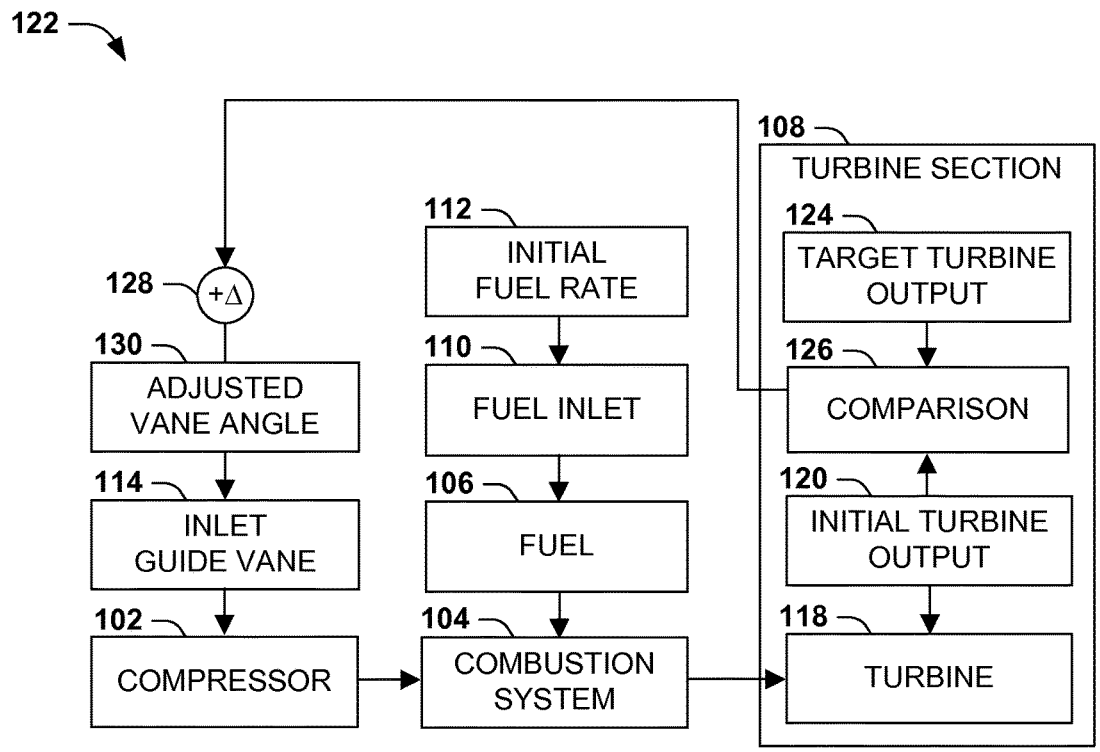

A turbine control system may provide control of this process in various ways. FIG. 1B presents an example of a feedback-based turbine control system utilizing operating properties including the vane angle of the inlet guide vane 114 and the fuel rate of fuel 106 through the fuel inlet 110 within an example turbine machine 122. A feedback-based controller receives a target turbine output 124, such as a request to achieve a higher or lower turbine output or to maintain a current turbine output. A comparison 126 of the target turbine output 124 to the initial turbine output 120 indicates whether the initial turbine output is to be adjusted upward or downward, and adjusts the inlet guide vane 114 to achieve the target turbine output 124. For example, in order to increase from the initial turbine output 120 to achieve a higher target turbine output 124, a controller may initiate an adjustment 128 in the initial vane angle 116 (FIG. 1A) of the inlet guide vane 114 (such as operating the inlet guide vane 114 at a higher adjusted vane angle 130). Because altering the initial vane angle 116 with the adjustment 128 typically results in a higher turbine output, the control loop may therefore be implemented as an iterative comparison 126 of the initial turbine output 120 and the target turbine output 124, and iterated adjustments 128 of the initial vane angle 116 until the target turbine output 124 is achieved.

B. Presented Techniques

While the example feedback-based turbine control system illustrated in the example turbine machine 100 of FIG. 1A and the example turbine machine 122 of FIG. 1B may achieve the target turbine output for the turbine, such control systems may exhibit some non-optimal operation segments in the control of the turbine. As a first example, the responsiveness of the adjustment of the turbine may be delayed due to the iterated feedback-based assessment of the adjustments on the turbine output of the turbine. Because the adjustments do not instantaneously alter the initial turbine output but rather involve a delay, each iteration utilizes a delay between implementing an adjustment; observing the effect on the turbine; and performing a second comparison resulting in the selection of different adjustments. Additionally, because the example feedback-based turbine control system in FIGS. 1A-1B does not account for the effects of individual adjustments but rather adjusts each operating condition in the direction of the target turbine output, the achieved control of the turbine output is imprecise; e.g., selecting adjustments that are each sufficient to achieve the difference between the initial turbine output and the target turbine output may result in an overshoot to the target turbine output resulting in a need for correction. As a third example, a particular adjustment may alter the turbine output of the turbine in varying degrees based on other operating properties of the turbine (e.g., the air temperature of air received through the inlet guide vane may affect the turbine output as well as the volume or rate of air), a feedback-based control system that does not account for the current effect of a particular adjustment may reduce the achievable precision of turbine control. While some control techniques may mitigate such disadvantages, such as the use of a proportional-integral-derivative (PID) feedback-based turbine control system to select the magnitude of adjustment between the initial turbine output 120 and the target turbine output, the inherent characteristics of feedback-based turbine control systems may diminish the achievable precision of turbine control.

Figure 2:
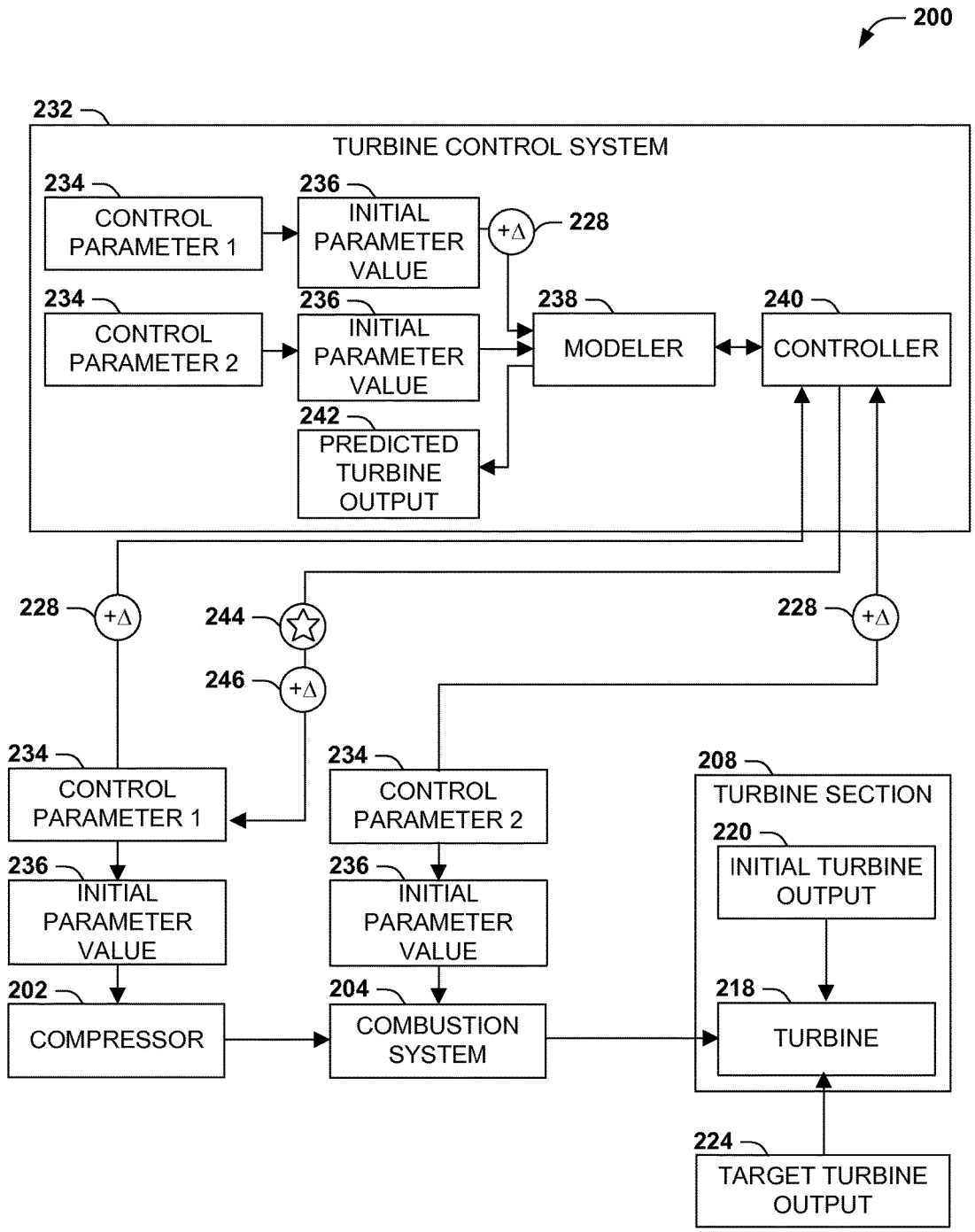
FIG. 2 is a schematic illustration of an example turbine machine with feed-forward-based turbine control in accordance with at least one aspect of the present invention.

Presented herein are techniques for feed-forward-based turbine control that may, in part, mitigate at least some of the non-optimal characteristics of feedback-based turbine control techniques. The example scenario 200 of FIG. 2 presents an illustration of an example turbine control system 232 usable with a turbine machine including a compressor 202 receiving air through an inlet guide vane at an initial vane angle; a combustion system 204 receiving fuel through a fuel inlet; and a turbine section 208 including a turbine 218 operating at an initial turbine output 220. The control of the turbine 218 is achieved by choosing initial parameter values 236 for respective control parameters 234, such as the vane angle of an inlet guide vane. An example feed-forward-based turbine control system 232 usable with such a turbine machine includes a modeler 238 and a controller 240. The modeler 238 predicts a predicted turbine output 242 from a set of parameter values for respective control parameters 234. The controller 240 utilizes the modeler 238 to control the adjustment of the parameter values of the control parameters 234 in order to operate the turbine 218 initially operating at an initial turbine output 220. Rather than choosing the parameter values in the direction of a target turbine output from an initial turbine output 220, the controller 240 utilizes the modeler 238 to predict the effect of adjustments 228 of each of the control parameters 234 on the initial turbine output 220 of the turbine 218. Based on the predicted turbine outputs achieved by respective adjustments 228 in the current operating environment of the turbine 218, the controller 240 selects a target control parameter 244 and a target adjustment 246 of the target control parameter 244 (more specifically, a target adjustment 246 of the initial parameter value 236 of the target control parameter 244) that, when used in combination with the initial parameter values 236 of the other control parameters 234 of the turbine 218, is predicted to adjust the initial turbine output 220 toward the target turbine output.

Figure 3A:
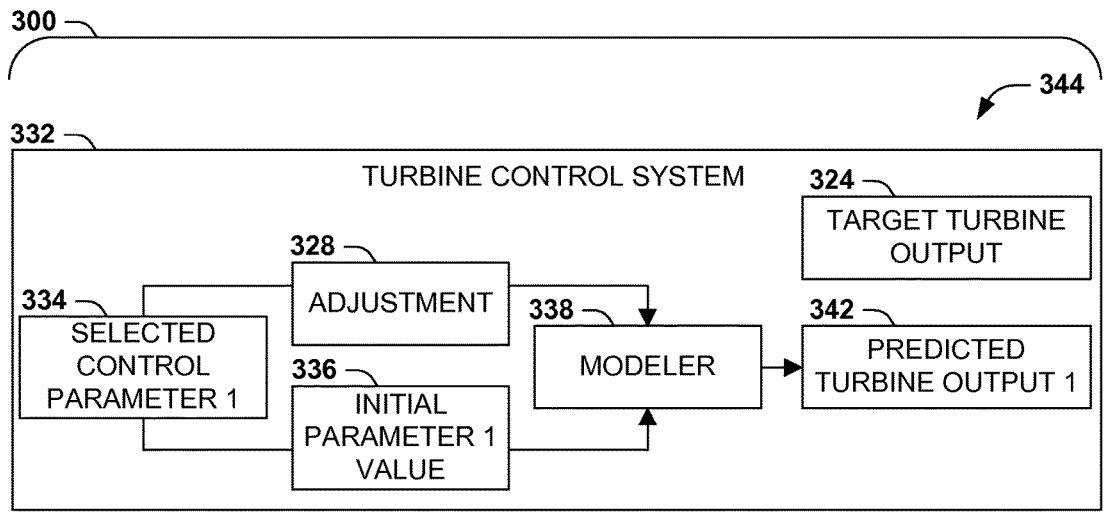
FIGS. 3A-3C are schematic illustrations of an example turbine machine featuring feed-forward control of a turbine in accordance with at least one aspect of the present invention.
Figure 3B:
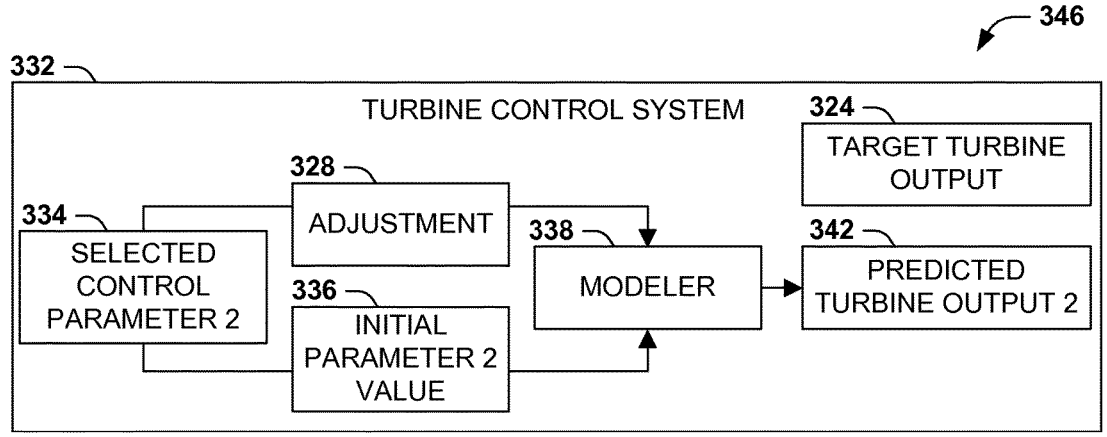
Figure 3C:
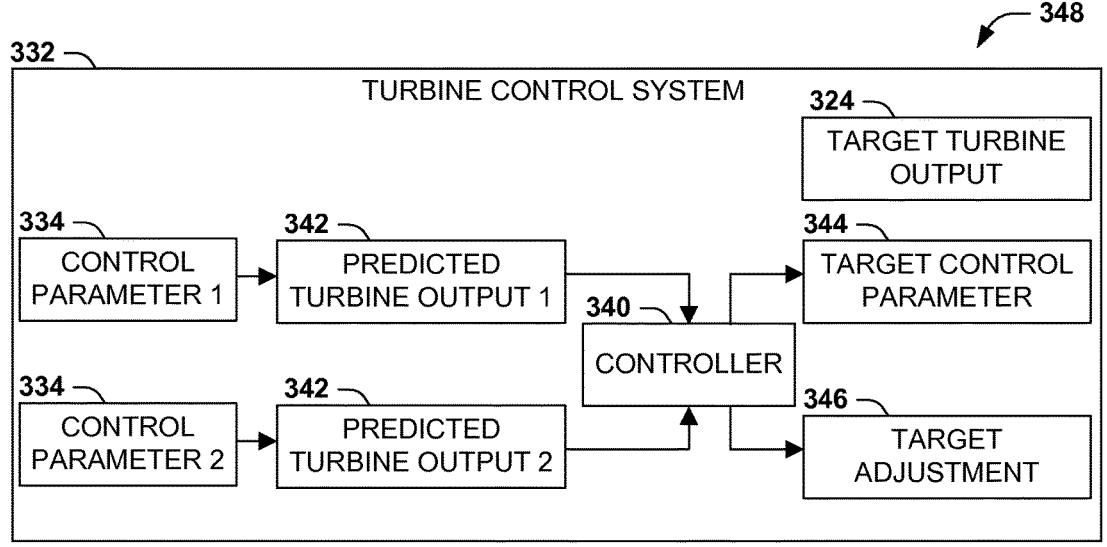

FIGS. 3A-3C illustrate a set of example scenarios that together present a stepwise example 300 of a feed-forward-based turbine control system 332 operating in accordance with the techniques presented herein. This stepwise example 300 again illustrates the control of a turbine by a turbine control system 332 including a modeler 338 and a controller 340, where the turbine control system 332 is informed of the initial parameter values 336 of the respective control parameters 334 of the turbine.

In FIG. 3A, as a first prediction 344, the turbine control system 332 invokes the modeler 338 with an adjustment 328 to an initial parameter value 336 of a first selected control parameter 334. The modeler 338 achieves a first predicted turbine output 342 resulting from applying the adjustment 328 to the initial parameter value 336 of the first selected control parameter 338, while using unadjusted initial parameter values 336 for the other control parameters 334 of the turbine.

In FIG. 3B, as a second prediction 346, the turbine control system 332 invokes the modeler 338 with an adjustment 328 to an initial parameter value 336 of a second selected control parameter 334. The modeler 338 achieves a second predicted turbine output 342 resulting from applying the adjustment 328 to the initial parameter value 336 of the second selected control parameter 334, while using unadjusted initial parameter values 336 for the other control parameters 334 of the turbine (including the unadjusted initial parameter value 336 of the first control parameter 334).

In FIG. 3C, a selection is performed, 348 wherein the controller 340 compares the target turbine output 324 and the respective predicted turbine outputs 342 achieved by applying the adjustment 328 of the respective control parameters 334. The controller 340 selects a target control parameter 344 having a target adjustment 346 that, when applied to the initial parameter value 336 of the target control parameter 344 in the control of the turbine, adjusts the turbine output of the turbine toward the target turbine output 324. This target adjustment 346, applied to the initial parameter value 336 of the target control parameter 344 while using the unadjusted initial parameter values 336 of other control parameters 334, therefore provides feed-forward, predictive control of the turbine. By seeking the target turbine output 324 based on the predicted effects of adjusting individual operating conditions of the turbine in accordance with the techniques presented herein, rather than adjusting all of the operating conditions heuristically toward the target turbine output 324, a feed-forward-based turbine control system such as illustrated in the stepwise example 300 of FIGS. 3A-3C may be capable of achieving control of the turbine output of the turbine with such improvements as faster responsiveness; faster attainment of a target turbine output 324; and tighter precision of the achievement of the target turbine output 324.

C. Example Embodiments

In addition to illustrating the techniques presented herein as discussed earlier, FIG. 2 also presents a schematic illustration of a first example embodiment of the techniques presented herein, where the example embodiment is the turbine machine 200 including the turbine control system 232 implementing the techniques presented herein. In this example scenario, the example turbine machine 200 may include structures/aspects previously presented. Specifically, the example turbine machine 200 includes a compressor 202; a combustion system 204; and a turbine section 208 including a turbine 218 operating at an initial turbine output 220. The turbine machine 200 also a set of control parameters 234 respectively having an initial parameter value 236, such as an inlet guide vane having an initial vane angle. The turbine machine 200 also includes a turbine control system 232, including a modeler 238 that, for a control parameter 234 of the turbine machine having an initial parameter value 236, predicts a predicted turbine output 242. The turbine control system 232 also includes a controller 240 that, for the respective selected control parameters 234, selects an adjustment 228 of the initial parameter value 236 of the selected control parameter 234, and invokes the modeler 238 with the adjustment 228 of the initial parameter value 236 of respective selected control parameters 234 and the unadjusted initial parameter values 236 of the other control parameters 234 of the turbine to predict a predicted turbine output 242. The modeler 238 also compares the predicted turbine outputs 242 for the adjustments 228 of the respective control parameters 234 to select, from the control parameters 234, a target control parameter 244 having a target adjustment 246 that results in the target turbine output 224; and operates the turbine 218 with the target adjustment 246 of the target control parameter 244.

Figure 4:
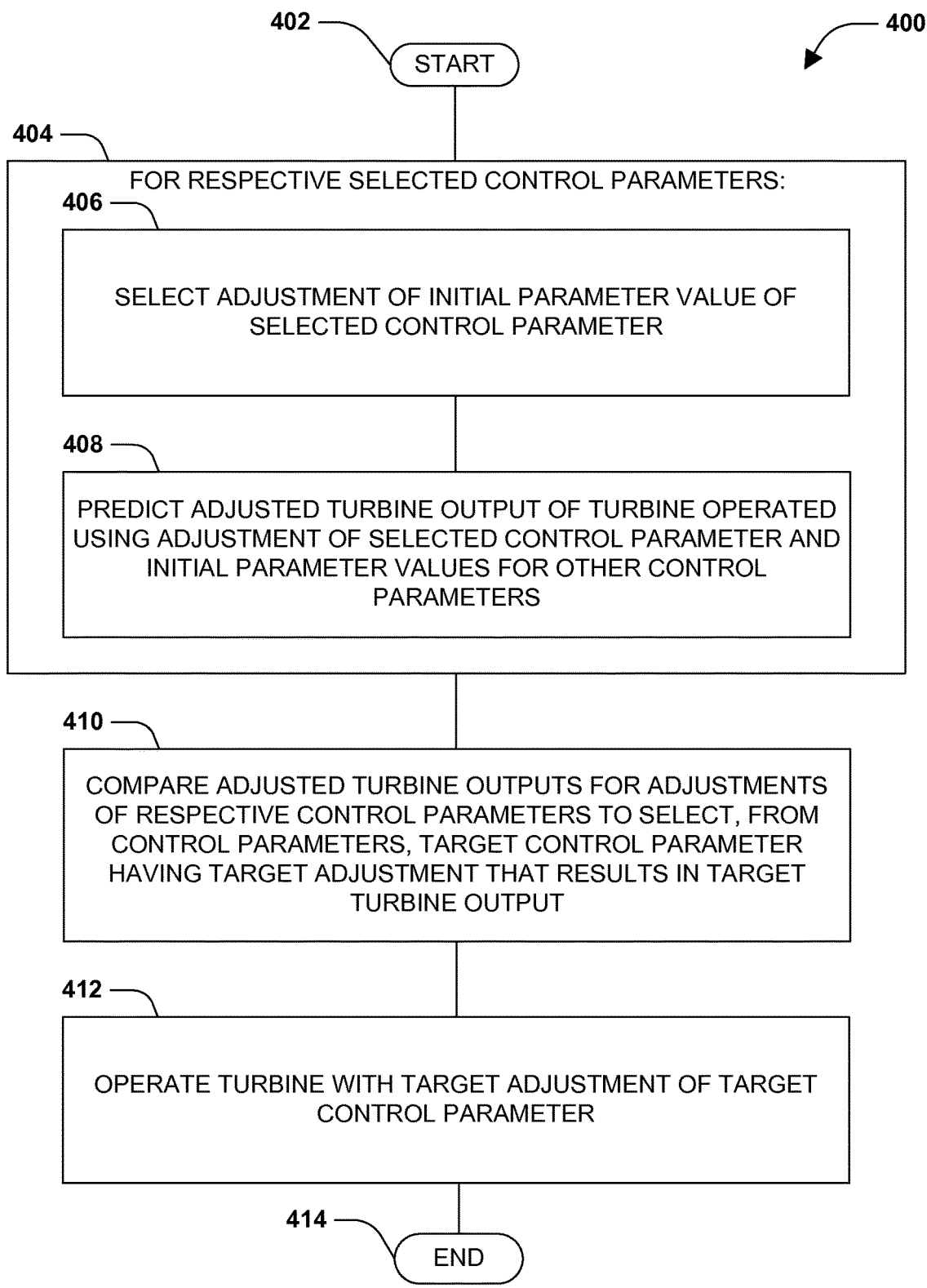
FIG. 4 is a flowchart of an example method of controlling a turbine with feed-forward control in accordance with at least one aspect of the present invention.

FIG. 4 is an illustration of a flow diagram illustrating one embodiment of a method of controlling a turbine 118. The example method may be implemented, e.g., as instructions executing on a processor of a device, where the instructions cause the device to achieve a target turbine output of a turbine operating at an initial turbine output while using, for respective control parameters of the turbine machine, an initial parameter value for the control parameter. The example method begins at 402. The example method 400 includes, for respective 404 selected control parameters, selecting 406 an adjustment of the initial parameter value of the selected control parameter, and predicting 408 a predicted turbine output of the turbine operated using the adjustment of the selected control parameter and the initial parameter values for other control parameters. The example method also includes comparing 410 the predicted turbine outputs for the adjustments of the respective control parameters to select, from the control parameters, a target control parameter having a target adjustment that results in the target turbine output. The example method also includes operating 412 the turbine with the target adjustment of the target control parameter. In this manner, the example method 400 achieves the control of the turbine in accordance with the techniques presented herein, and so ends at 414.

Embodiments of the techniques presented herein may include a computer-readable storage medium usable to cause a device to control a turbine according to the techniques presented herein. Such computer-readable storage media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as Wi-Fi, a personal area network (PAN) such as Bluetooth, or a cellular or radio network), and which encodes a set of computer-readable instructions that, when executed by a processor of a device, cause the device to implement the techniques presented herein.

Figure 5:
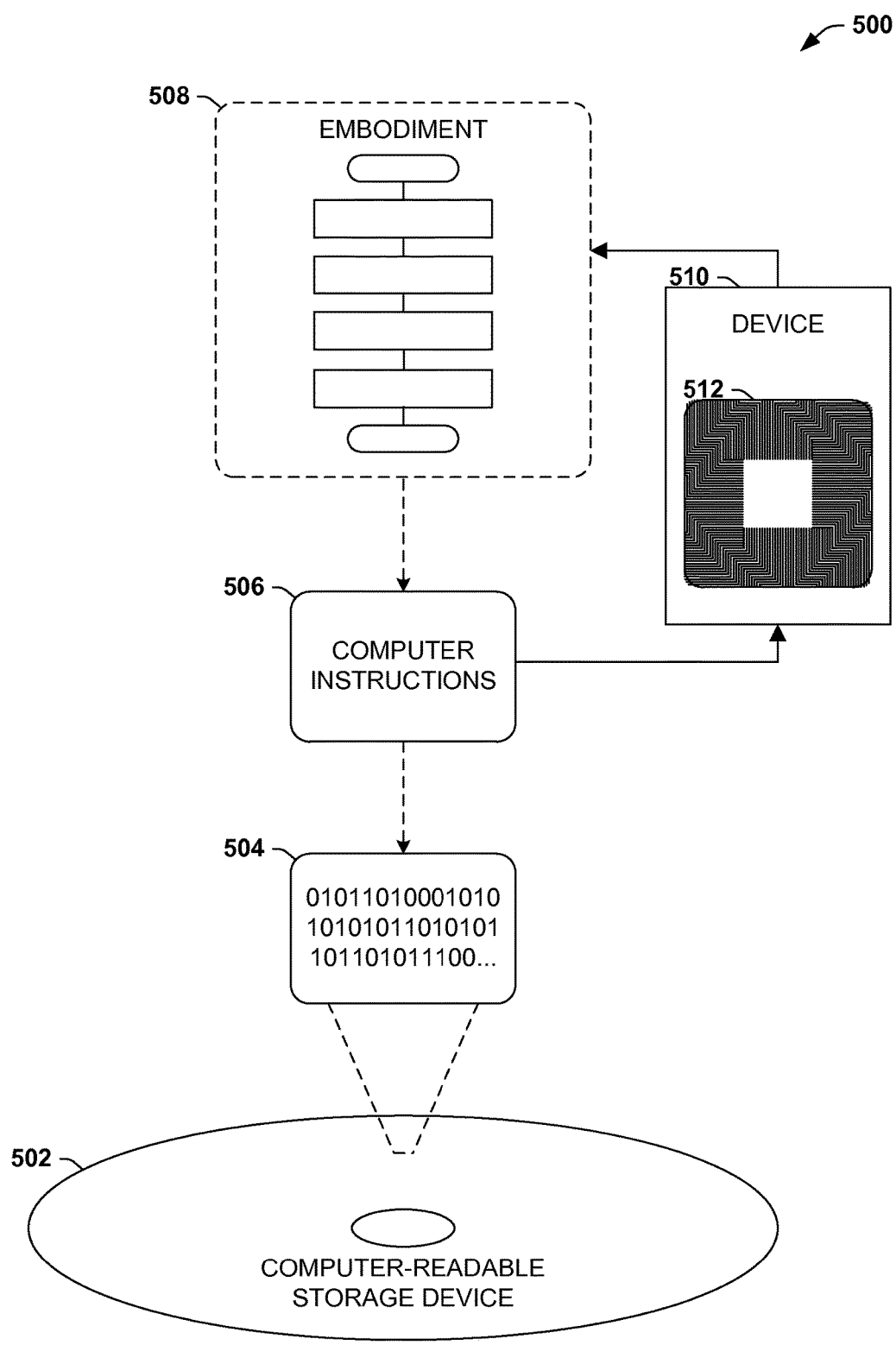
FIG. 5 is a schematic illustration of an example computer-readable storage medium usable to with a device having a processor to control a turbine with feed-forward-based control in accordance with at least one aspect of the present invention.

FIG. 5 is an illustration of on embodiment of a computer-readable storage medium, including a computer-readable storage medium 500 (e.g., a CD-R, DVD-R, or a platter of a hard disk drive), on which is encoded computer-readable data 502. This computer-readable data 502 in turn includes a set of computer instructions 504 configured to provide an embodiment 508 of an aspect of the present invention. In one such embodiment, the processor-executable instructions 504 may be configured to, when executed on a processor 512 of a device 510, cause the device 510 to perform a method of controlling a turbine, such as the example method 400 of FIG. 4. In another such embodiment, the instructions 506 may implement the components of a turbine control system that operates a turbine in accordance with the techniques presented herein, such as the example turbine control system 232 of FIG. 2. Many such computer-readable media may be devised by those of ordinary skill in the art that are configured to operate in accordance with the techniques presented herein.

D1. Scenarios

A first aspect that may vary among embodiments of these techniques relates to the scenarios wherein such techniques may be utilized.

As a first variation of this first aspect, the techniques presented herein may be utilized to control many types of turbine machines, such as power generation facilities, vehicle power systems, and industrial manufacturing processes. Such processing machines may also use many types of control parameters, such as various properties of fuel injected by many types of fuel inlets into many types of combustion systems; of air injected into many types of compressors from many types of inlet guide vanes; and other properties of many types of turbine sections including many types of turbines.

As a second variation of this first aspect, the metrics used and generated by the turbine control system may be specified in many ways. As a first example, the initial turbine output and target turbine output may be measured in many ways, such as temperature; power output; pressure ratio; emissions, and fuel consumed; or relative to a goal, such as the percentage of a target energy production rate that the turbine machine currently produces. As a second example, the target turbine output may be specified in absolute terms (e.g., power output) or relative to the initial turbine output (e.g., 20% higher than the initial turbine power output).

As a third variation of this first aspect, many architectures may be selected for a turbine machine implementing the techniques presented herein. For example, the turbine control system may be physically integrated with the turbine section, the compressor, and/or the combustion system. Alternatively, the turbine control system may include a remote control logic that remotely monitors the operating conditions of the turbine and sends instructions for controlling the fuel inlet and/or inlet guide vane in accordance with the techniques presented herein. As another example, the turbine control system may provide instructions to the turbine in near real-time (e.g., the initial turbine output may specify a current turbine output of the turbine in current operation at a current time; the initial fuel rate may specify a current fuel rate at the current time; the initial vane angle may specify a current vane angle at the current time; and the controller may achieve the target turbine output by evaluating adjustments current parameter values resulting in a current turbine output that may enable the current turbine output to migrate toward the target turbine output). Alternatively, the turbine control system may be applied to forecast control parameters to be used in the future (e.g., preparing a set of adjustments of various parameter values for use at a future time), and/or to analyze retroactively the control of a turbine machine. Many such variations may be devised by those of ordinary skill in the art of turbine control systems.

D2. Modeler and Target Adjustment Selection Variations

A second aspect that may vary among embodiments of these techniques relates to the implementation of the modeler to, for a set of parameter values for respective control parameters of the turbine, provide a predicted turbine output.

Figure 6A:
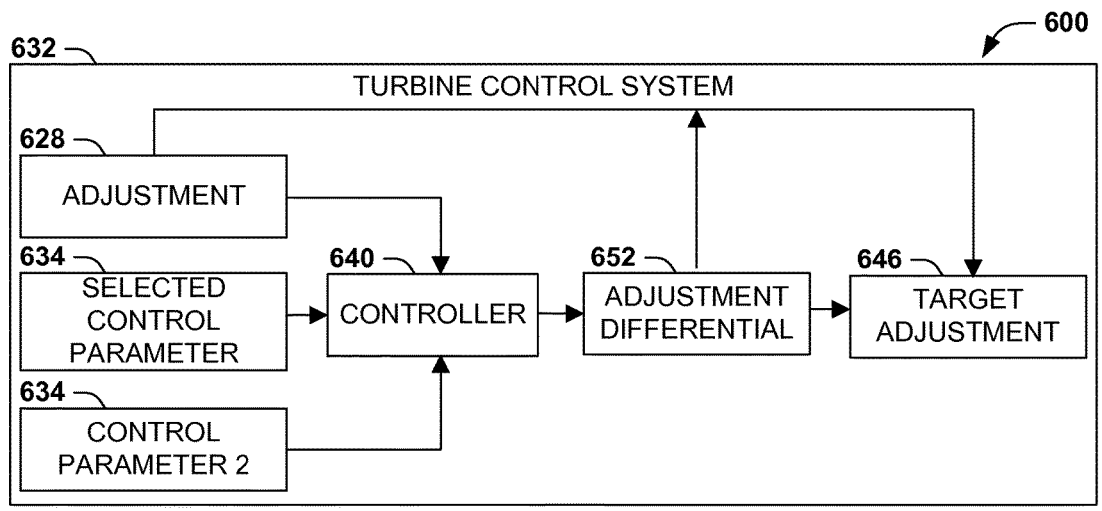
FIG. 6A is a schematic illustration presenting a first variation of systems for controlling a turbine with feed-forward-based control in accordance with at least one aspect of the present invention.

FIG. 6A presents an illustration of a first variation of this second aspect. In this first variation, a controller 640 selects an adjustment 628 of a selected control parameter 634 and determines an adjustment differential 652 of the selected control parameter 634. The adjustment differential 652 may then be used to select the target adjustment 646 if the selected control parameter 634 is selected as a target control parameter 644.

In some embodiments, the controller 640 first selects a first adjustment 628 of a selected control parameter 634, and invokes the modeler 638 with the first adjustment 628 of the selected control parameter 634 to determine a first predicted turbine output 642; and then selects a second adjustment 628 of a selected control parameter 634, and invokes the modeler 638 with the second adjustment 628 of the selected control parameter 634 to determine a second predicted turbine output 642. In one such embodiment, the first adjustment 628 is in an opposite direction of the second adjustment 628 of the selected control parameter 634.

Figure 6B:
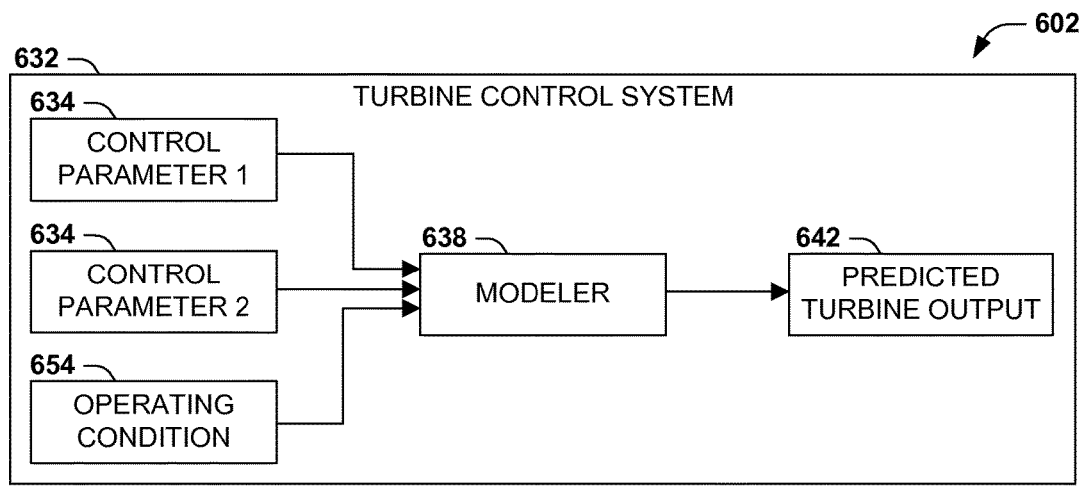
FIG. 6B is a schematic illustration presenting a second variation of systems for controlling a turbine with feed-forward-based control in accordance with at least one aspect of the present invention.

FIG. 6B presents an illustration of an example scenario 602 featuring a second variation of this second aspect. In this example scenario 602, a turbine machine further includes a sensor that detects an operating condition 654 that is not a control parameter 634 of the turbine, such as the weather conditions in the region of the turbine. In addition to invoking the modeler 638 with an adjustment 628 of a selected control parameter 634 and the initial parameter values of other control parameters 634, the controller 640 invokes the modeler 638 with the operating condition 654 detected by the sensor.

Figure 6C:
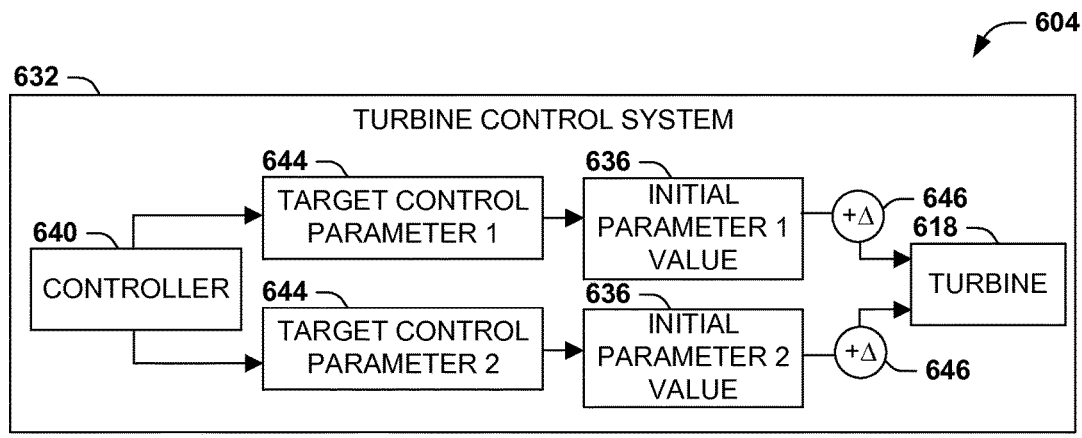
FIG. 6C is a schematic illustration presenting a third variation of systems for controlling a turbine with feed-forward-based control in accordance with at least one aspect of the present invention.

FIG. 6C presents an illustration of an example scenario 604 featuring a third variation of this second aspect. In this example scenario 604, the controller 640 identifies a first target adjustment 646 of the first initial parameter value 636 of a first target control parameter 644, and a second target adjustment 646 of the first initial parameter value 636 of a second target control parameter 644, that together achieve the target turbine output of the turbine 618. Accordingly, the controller 640 selects both of the target control parameters 644 and both of the target adjustments 646 for the operation of the turbine 618.

D3. Controller Variations

A third aspect that may vary among embodiments relates to variations in the operation of the controller.

As a first variation of this third aspect, the controller may apply the adjustments 646 of the target control parameters 644 at various frequencies (e.g., continuously or periodically), and/or upon detecting various events.

As a first example of this first variation of this third aspect, in an embodiment, the controller invokes the modeler with an adjustment of the initial parameter value of a selected control parameter to predict a predicted turbine output toward a target turbine output, and invokes the modeler with the adjustment of the initial parameter value of the selected control parameter, only upon receiving a target turbine output that is different than an initial turbine output, and/or only upon detecting fluctuation in the initial turbine output or an initial parameter value (e.g., while endeavoring to hold the initial turbine output constant).

Alternatively or additionally, in an embodiment, the controller invokes the modeler with the adjustment of the selected control parameter, and invokes the modeler with the adjustment of the initial control parameter, only upon detecting an operating condition adjustment of an operating condition (e.g., a change in intake air temperature that may alter the predictions of the modeler).

As a second example of this first variation of this third aspect, a turbine machine may predict the predicted turbine output for various adjustments of various selected control parameters at a first frequency, and may select the target control parameter 644 and the target adjustment 646 at a second, higher frequency.

As a third example of this first variation of this third aspect, the controller uses the predicted turbine output for at least two selections of the target adjustments 646 of the target control parameters 644 (e.g., invoking the modeler only occasionally to update the adjustment differentials).

As a fourth example of this first variation of this third aspect, in an embodiment, the modeler continuously predicts the predicted turbine output (e.g., so that adjustment parameters are readily available when needed), and the controller only periodically invokes the modeler to select the target control parameter and the target adjustment.

As a second variation of this third aspect, the controller may utilize the feed-forward turbine control technique in addition to other techniques in order to control the turbine. In an embodiment, the controller further applies a filter to the target adjustment 646 and/or the predicted turbine output while selecting the target adjustment resulting in the target turbine output.

As a third variation of this third aspect, the controller may utilize the target adjustments of target control parameters in various ways. In a first such embodiment, the controller promptly alters the target control parameters to achieve a current target turbine output. In a second such embodiment, the controller gradually and incrementally applies the target adjustments of one or more target control parameters guide to gradually and incrementally achieve the target turbine output. In a third such embodiment, in addition to using the feed-forward based turbine control, a turbine machine also uses feedback-based turbine control (e.g., as an additional control mechanism that further refines the precision of turbine control).

Figure 7:
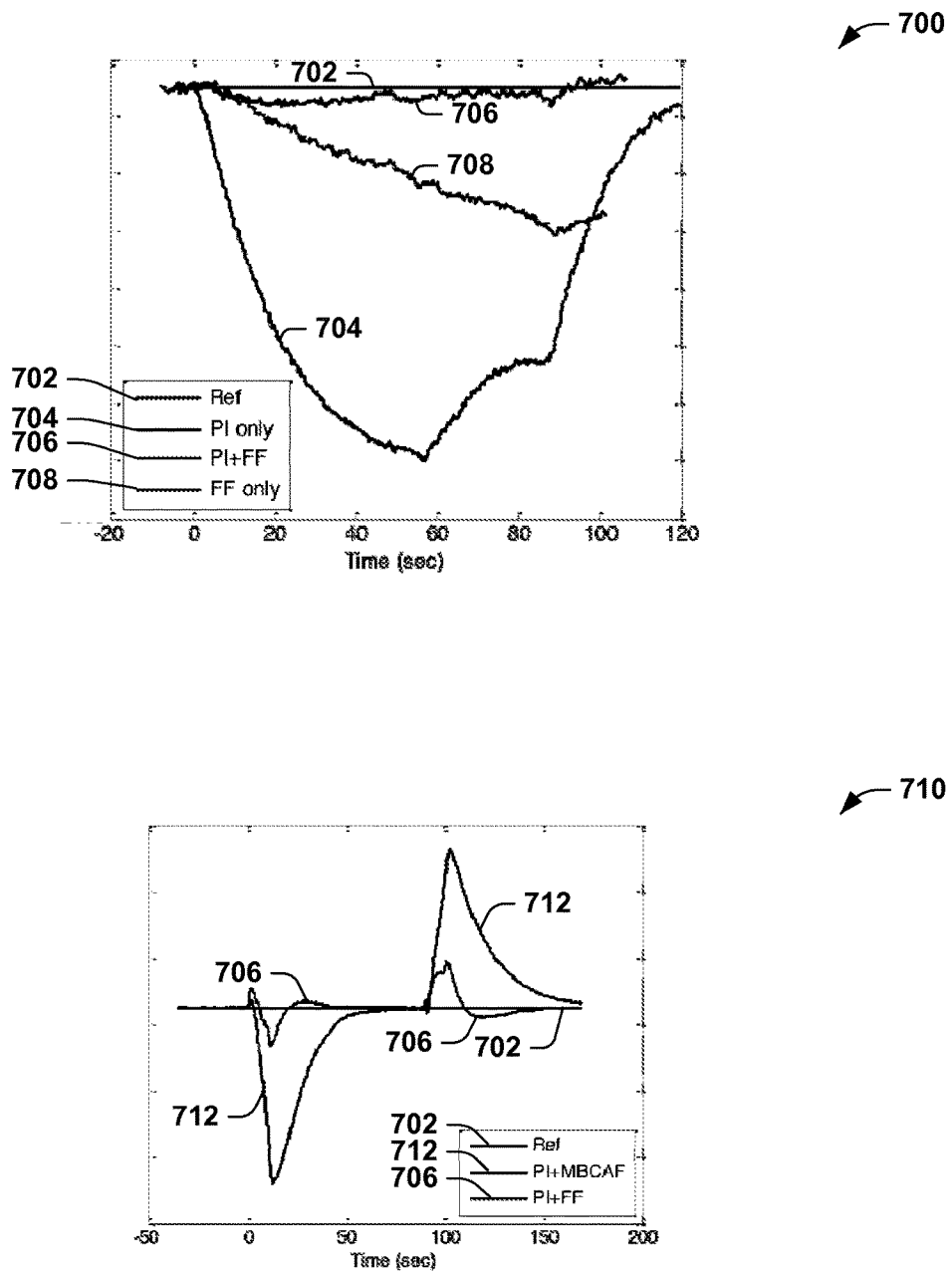
FIG. 7 presents a set of charts of model results of turbine control based on various techniques, including feed-forward-based control techniques in accordance with at least one aspect of the present invention.

FIG. 7 presents a set of charts of model results that illustrate the precision, responsiveness, and other characteristics of turbine control that are achievable with different sets of turbine control techniques. A first chart 700 demonstrating the comparative responsiveness of various turbine control techniques in maintaining a relative turbine output over time (e.g., a reference turbine output 702) in the presence of a disturbance. A proportional-integral-differential (PID) control technique 704, used in isolation, demonstrates a significant delay in restoring the reference turbine output 702. A feed-forward-based control technique 708 demonstrates a modestly higher degree of conformity of turbine output than the PID control technique 704, but demonstrates significant drift from the reference turbine output 702. A combined technique, including both a PID control technique 704 and a feed-forward-based control technique 708, demonstrates both high-precision maintenance of the reference turbine output 702 and an avoidance of drift from the reference turbine output 702.

A second chart 710 demonstrates the precision with which a reference turbine output 702 is maintained in response to fluctuation of operating parameters (e.g., the susceptibility of various turbine control techniques to over-correction and under-correction). A PID control technique including feedback-based control 712 shows large deviations from the reference turbine output 702 due to the fluctuating operating parameters, while a hybrid PID/feed-forward-based control technique 706 demonstrates significantly reduced deviations. These charts illustrate some achievable advantages that may be achievable in some embodiments of the turbine control techniques presented herein.

E. Computing Environment

Figure 8:
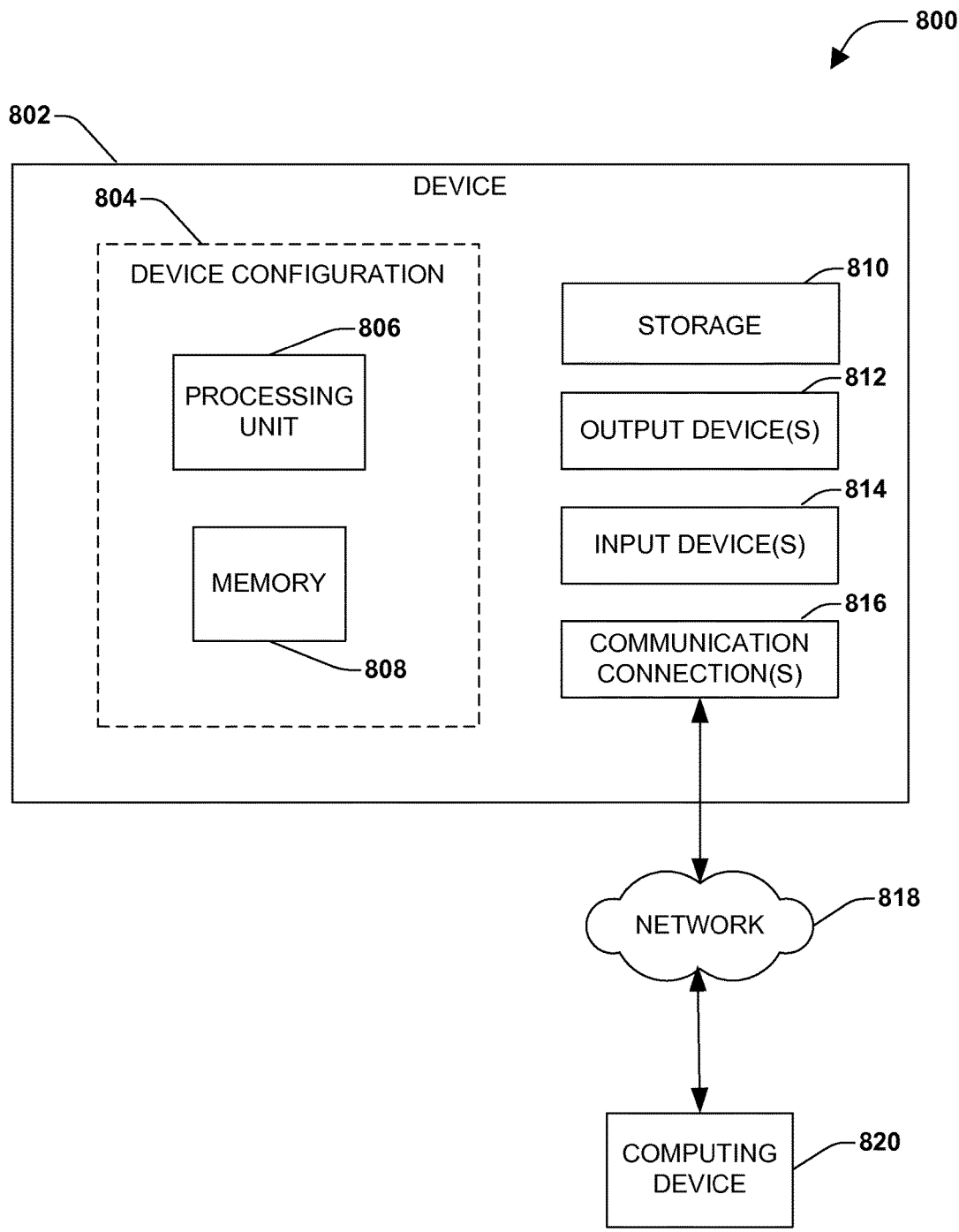
FIG. 8 is a schematic illustration of an example of a device on which at least one aspect of the present invention may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 800 including a computing device 802 configured to implement one or more embodiments provided herein. In one configuration, computing device 802 includes at least one processing unit 806 and memory 808. Depending on the exact configuration and type of computing device, memory 808 may be volatile (such as RAM, for example), non-volatile (such as ROM, flash memory, etc., for example) or some combination of the two. This configuration is illustrated in FIG. 8 by dashed line 804.

In other embodiments, device 802 may include additional features and/or functionality. For example, device 802 may also include additional storage (e.g., removable and/or non-removable) including, but not limited to, magnetic storage, optical storage, and the like. Such additional storage is illustrated in FIG. 8 by storage 810. In one embodiment, computer readable instructions to implement one or more embodiments provided herein may be in storage 810. Storage 810 may also store other computer readable instructions to implement an operating system, an application program, and the like. Computer readable instructions may be loaded in memory 808 for execution by processing unit 806, for example.

The term "computer readable media" as used herein includes computer-readable storage devices. Such computer-readable storage devices may be volatile and/or non-volatile, removable and/or non-removable, and may involve various types of physical devices storing computer readable instructions or other data. Memory 808 and storage 810 are examples of computer storage media. Computer-storage storage devices include, but are not limited to, RAM, ROM, EEPROM, flash memory or other memory technology, CD-ROM, Digital Versatile Disks (DVDs) or other optical storage, magnetic cassettes, magnetic tape, and magnetic disk storage or other magnetic storage devices.

Device 802 may also include communication connection(s) 816 that allows device 802 to communicate with other devices. Communication connection(s) 816 may include, but is not limited to, a modem, a Network Interface Card (NIC), an integrated network interface, a radio frequency transmitter/receiver, an infrared port, a USB connection, or other interfaces for connecting computing device 802 to other computing devices. Communication connection(s) 816 may include a wired connection or a wireless connection. Communication connection(s) 816 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 802 may include input device(s) 814 such as keyboard, mouse, pen, voice input device, touch input device, infrared cameras, video input devices, and/or any other input device. Output device(s) 812 such as one or more displays, speakers, printers, and/or any other output device may also be included in device 802. Input device(s) 814 and output device(s) 812 may be connected to device 802 via a wired connection, wireless connection, or any combination thereof. In one embodiment, an input device or an output device from another computing device may be used as input device(s) 814 or output device(s) 812 for computing device 802.

Components of computing device 802 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 802 may be interconnected by a network. For example, memory 808 may include multiple physical memory units located in different physical locations interconnected by a network.

Those skilled in the art will realize that storage devices utilized to store computer readable instructions may be distributed across a network. For example, a computing device 820 accessible via network 818 may store computer readable instructions to implement one or more embodiments provided herein. Computing device 802 may access computing device 820 and download a part or all of the computer readable instructions for execution. Alternatively, computing device 802 may download pieces of the computer readable instructions, as needed, or some instructions may be executed at computing device 802 and some at computing device 820.

F. Use of Terms

Embodiments or examples, illustrated in the drawings, are disclosed below using specific language. These examples are provided to disclose the invention, including the best mode, and also to enable any person skilled in the art to practice the invention, including making and using any devices or systems and performing any incorporated methods. The embodiments or examples are not intended to be limiting. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Any alterations and modifications in the disclosed embodiments, and any further applications of the principles disclosed in this document are contemplated as would normally occur to one of ordinary skill in the pertinent art.

Although the subject matter has been described in language specific to structural features and/or methodological acts, it is to be understood that the subject matter of the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims.

G. Technical Effect

In an embodiment, the techniques presented herein enable the control of one or more turbine outputs of a turbine (e.g., turbine power output) toward a target turbine output by adjusting a set of turbine parameters (e.g., fuel rate and inlet guide vane angle) in a differential manner based on the current conditions of the turbine.

What is claimed is:

1. A turbine machine, comprising:
    a compressor;
    a combustion system;
    a turbine section comprising a turbine operating at an initial turbine output while using, for respective control parameters of the turbine machine, an initial parameter value for the control parameter; and
    an automatic turbine control system comprising:
        a modeler that predicts a predicted turbine output when the turbine is operated at, for respective control parameters, a parameter value; and
        a controller that:
            for respective selected control parameters:
                selects an adjustment of the initial parameter value of the selected control parameter, and
                invokes the modeler with the adjustment of the selected control parameter and the initial parameter values for other control parameters to predict a predicted turbine output for the selected control parameter;
            compares the predicted turbine outputs for the adjustments of the respective control parameters to select, from the control parameters, a target control parameter having a target adjustment that results in the target turbine output; and
            operates the turbine with the target adjustment of the target control parameter:
    wherein:
    the initial turbine output comprises a current turbine output of the turbine in current operation at a current time; and
    the initial parameter values for the respective control parameters comprise a current parameter value of the control parameter while the turbine in current operation at the current time.

2. The turbine machine of claim 1, wherein the turbine control system selects the target control parameter by:
    for the respective selected control parameters, comparing the initial turbine output with the predicted turbine output while operating the selected control parameter with the adjustment of the selected control parameter to determine an adjustment differential; and
    selecting the target control parameter having the target adjustment by using the adjustment differential of the target control parameter.

3. The turbine machine of claim 2, wherein the turbine control system:
    invokes the modeler with a first adjustment of the selected control parameter and the initial parameter values for other control parameters to predict a first predicted turbine output;
    invokes the modeler with a second adjustment of the selected control parameter and the initial parameter values for other control parameters to predict a second predicted turbine output; and selects the target adjustment by comparing the first predicted turbine output using the first adjustment of the selected control parameter and the second adjusted turbine output using the second adjustment of the selected control parameter.

4. The turbine machine of claim 3, wherein the first adjustment is in an opposite direction from the initial parameter value of the selected control parameter as the second adjustment.

5. The turbine machine of claim 1, wherein:
the modeler predicts a predicted turbine output when the turbine is operated at, for respective control parameters, a parameter value, and an operating condition that is not a control parameter;
the turbine machine further comprises a sensor that detects a current operating condition of the turbine; and
the controller predicts the predicted turbine output for the respective selected control parameters by invoking the modeler with the adjustment of the selected control parameter, the initial parameter values for other control parameters, and the operating condition.

6. The turbine machine of claim 5, wherein the controller invokes the modeler with the adjustment of the respective selected control parameters only upon detecting an operating condition adjustment of the operating condition.

7. The turbine machine of claim 1, wherein the controller:
compares the predicted turbine outputs for the adjustments of the respective control parameters to select a first target control parameter having a first target adjustment, and a second target control parameter having a second target adjustment, that together result in the target turbine output; and
operates the turbine with the first target adjustment of the first target control parameter and the second target adjustment of the second target control parameter.

8. The turbine machine of claim 1, wherein the controller applies a filter to the respective adjustments of the selected control parameters while predicting the predicted turbine output for the selected control parameter.

9. The turbine machine of claim 1, wherein the controller uses the target turbine output predicted for the adjustment of respective selected control parameters for at least two comparisons of the predicted turbine outputs for the adjustments of the respective control parameters.

10. The turbine machine of claim 1, wherein:
the controller invokes, at a first frequency, the modeler with the adjustment of the selected control parameter and the initial parameter values for other control parameters to predict the predicted turbine output for the selected control parameter; and
the controller compares the predicted turbine outputs for the adjustments of the respective control parameters to select, at a second frequency that is higher than the first frequency, the target control parameter having the target adjustment that results in the target turbine output.

11. The turbine machine of claim 1, wherein the controller invokes the modeler with the adjustment of the selected control parameter and the initial parameter values for other control parameters to predict the predicted turbine output for the selected control parameter only upon receiving a target turbine output adjustment of the target turbine output.

12. The turbine machine of claim 1, wherein the controller:
continuously invokes the modeler with the adjustment of the selected control parameter and the initial parameter values for other control parameters to predict the predicted turbine output for the selected control parameter; and
periodically selects the target control parameter having the target adjustment that results in the target turbine output.

13. The turbine machine of claim 1, wherein the turbine control system adjusts the target control parameter by:
defining a set of selected control parameters which affect the target turbine output, but which are not actively controlling the target turbine output,
defining a target control parameter which will actively control the target turbine output,
operating a controller that:
for the set of selected control parameters and the target control parameter;
selects an adjustment of the initial parameter value of the selected control parameters and the target control parameter, and
invokes the modeler with the adjustment of the selected/target control parameter(s) and the initial parameter values for other control parameters to predict a predicted turbine output for the selected control parameters and target control parameter, respectively;
comparing the respective predicted turbine output changes for the adjustments of the selected control parameters and target control parameters:
calculating an adjustment to the target control; parameter such that the effect of changing any combination of the selected control parameters on the target turbine output is nullified by the adjustment to the target control parameter.

14. A method of achieving a target turbine output of a turbine operating at an initial turbine output while using, for respective control parameters of the turbine machine, an initial parameter value for the control parameter, the method comprising:
for respective selected control parameters:
selecting an adjustment of the initial parameter value of the selected control parameter, and
predicting a predicted turbine output of the turbine operated using the adjustment of the selected control parameter and the initial parameter values for other control parameters;
comparing the predicted turbine outputs for the adjustments of the respective control parameters to select, from the control parameters, a target control parameter having a target adjustment that results in the target turbine output; and
operating the turbine with the target adjustment of the target control parameter;
wherein:
the initial turbine output comprises a current turbine output of the turbine in current operation at a current time; and
the initial parameter values for the respective control parameters comprise a current parameter value of the control parameter while the turbine in current operation at the current time.

15. The method of claim 14, wherein selecting the target control parameter further comprises:
for the respective selected control parameters, comparing the initial turbine output with the predicted turbine output while operating the selected control parameter with the adjustment of the selected control parameter to determine an adjustment differential; and selecting the target control parameter having the target adjustment by using the adjustment differential of the target control parameter.

16. The method of claim 14, wherein selecting the target control parameter from the respective selected control parameters further comprises:
  selecting a first adjustment of the initial parameter value of the selected control parameter;
  predicting a first predicted turbine output of the turbine operated using the first adjustment of the selected control parameter and the initial parameter values for other control parameters;
  selecting a second adjustment of the initial parameter value of the selected control parameter, where the second adjustment is different from the first adjustment;
  predicting a second predicted turbine output of the turbine operated using the second adjustment of the selected control parameter and the initial parameter values for other control parameters; and
  comparing the first predicted turbine output and the second predicted turbine output to select the target adjustment of the target control parameter that results in the target turbine output.

\* \* \* \* \*